United States Patent [19]

Hopkins et al.

[11] 4,279,429
[45] Jul. 21, 1981

[54] VEHICLE WITH ADJUSTABLE STEERING AXIS ANGLE CONTROL

[76] Inventors: Grant Hopkins, 29½ Lenore; Mark Cantrell, 150 Wilbur, Box 60, both of Walla Walla, Wash. 99362

[21] Appl. No.: 112,338

[22] Filed: Jan. 15, 1980

[51] Int. Cl.³ .................... B62K 5/08; B62K 21/00
[52] U.S. Cl. .................... 280/267; 280/266; 280/281 LP; 280/282; 280/97; 280/109; 280/111
[58] Field of Search .............. 280/263, 266 X, 267, 280/268, 282, 281 W, 281 LP, 87.04 B, 97, 109, 111

[56] References Cited

U.S. PATENT DOCUMENTS

| | | | |
|---|---|---|---|
| 1,548,973 | 8/1925 | Beeler | 280/87.04 |
| 2,482,472 | 9/1949 | Fried | 280/281 W |
| 3,062,559 | 11/1962 | Hewitt | 280/282 |
| 3,311,388 | 3/1967 | Ryan et al. | 280/282 |
| 3,403,927 | 10/1968 | Rettger, Jr. | 280/282 |
| 3,669,468 | 6/1972 | Rich | 280/267 |
| 3,799,565 | 3/1974 | Burtis et al. | 280/282 |
| 3,913,929 | 10/1975 | Matsuara | 280/282 |
| 4,198,072 | 4/1980 | Hopkins | 280/267 |

*Primary Examiner*—David M. Mitchell
*Assistant Examiner*—Donn McGiehan
*Attorney, Agent, or Firm*—Wells, St. John & Roberts

[57] ABSTRACT

A vehicle powered to move about on a front drive wheel and rearward supports, preferably a pair of wheels. The rear wheels are mounted to the frame by a steering control mechanism that facilitates pivotal steering movement of the rear wheels about two axes - a steering axis and a steering control axis. The steering control axis is coaxial with the rear wheels and is perpendicular to the steering axis. The angle of the steering axis may be varied about the steering control axis. Steering is accomplished by the rider shifting his weight from one side of the vehicle to the other. He may shift the steering axis to a position substantially parallel with the ground surface so the frame may be tilted like a bicycle in wide, sweeping high speed curves. The rear wheels then track behind the front wheels as the frame tilts about the steering axis. If the rider shifts the steering axis to a position nearly perpendicular to the ground, he may negotiate short radius, low speed turns. In this situation, the rear wheels turn about the steering axis and the frame tilts only slightly in response to leaning by the rider. Shifting of the steering axis is accomplished by lifting or lowering handles affixed to the axle.

13 Claims, 6 Drawing Figures

VEHICLE WITH ADJUSTABLE STEERING AXIS ANGLE CONTROL

BACKGROUND OF THE INVENTION

The present invention is related generally to vehicles having a single forward driven wheel and a steerable pair of rear movable supports such as wheels.

For generations, youngsters have enjoyed riding tricycles. However, the advent of low swung molded plastic three-wheeled velocipedes that place the rider below the axis of the front drive wheel have captured much of the standard tricycle market. Indeed, the standard form of tricycle has quickly become antiquated and the term "trike" is unknown to many youngsters.

The vehicles that are displacing "trikes" are both faster and maneuverable. The low center of gravity produced by placing the rider below the rotational axis of the front driving wheel also adds a considerable safety factor in that the vehicle becomes extremely difficult to roll laterally. Additional advantages to the newer vehicle forms become very apparent when one watches a youngster maneuver his "Big Wheel" (trademark) into a tight corner at high speed.

The newer, low-slung tricycle is designed specifically for youngsters, not for the adolescent-to-adult group. Adolescents must give up the vehicles they outgrow for the more "grown up" bicycle, leaving behind the thrill of scooting along inches from the ground surface.

Modern "tricycles" are not typically designed to give the rider total steering control. Bicycles, on the other hand, can be leaned into a curve to counteract centrifugal forces. It is the rider more than mechanical steering apparatus who initiates and actually produces the turning impetus. The typical tricycle, old or new, is designed with three point ground contact geometry to mechanically withstand centrifugal force without substantial assistance from the rider. When the centrifugal force overcomes the resistance produced by the tricycle geometry, the result is a sudden outward slide or roll of the vehicle and rider. The point at which centrifugal outward force overcomes the resistance offered by the tricycle occurs so quickly that it is not generally within the capability of the rider to correct or compensate by shifting his body weight into the turn.

It therefore becomes desirable to obtain a vehicle that will provide greater maneuverability than standard tricycles and that gives the rider greater control of the apparatus in turns.

The maneuverability problem briefly discussed above has been realized to a limited extent by some manufacturers of the new forms of tricycles. Some designs provide rear steering wheels that are set about a fixed incline steering axis. By doing this, the rider is able to turn the vehicle while simultaneously leaning it in the direction of turn; the sharper the turning radius, the greater the inclination into the turn. These forms of tricycles are an improvement over the fixed wheel variety, but still lack the desirable feature of adjustability for the angle of the steering axis. The rider is still not allowed total vehicular control. Steering conditions are the same regardless of the operating speed.

Some steering adjustments have been provided on "skateboards" which provide adjustable undercarriages. Steering is accomplished by the rider as he shifts his weight from one side to the other. The steering axis can be adjusted when the board is not in use through various clamp release, set screw, and other mechanical adjustment features. The difficulty remains, however, of being able to control the steering characteristics of the vehicle while the vehicle is in use.

A more substantial improvement has been developed in a vehicle having a front driver wheel and rear wheels that are steerable about a rider adjustable steering axis which is disclosed in U.S. Pat. No. 4,198,072 granted to Grant Hopkins. The steering axis, a steering control axis, and the rear wheel axis are nonintersecting and spaced apart from one another. The steering axis and wheel axis pivot about the remote steering control axis as the rider changes his posture against a pivoted backrest. The rider can change the steering response by shifting his posture between sitting and supine positions. The vehicle steering response thus varies with the angular position of the backrest. This feature enables substantial rider control but is somewhat difficult to master. Additionally, the linkage and carriage mechanism mounting the rear wheels is bulky and cumbersome, adding to the weight and overall cost of the vehicle.

The present invention represents a substantial improvement in the above described vehicle and steering mechanism by providing a compact steering control assembly with the steering axis, steering control axis and wheel axis all intersecting, preferably, with the wheel axis and steering control axis coaxial. The steering control axis is operated from hand grips on the axle and the rider sits in a constant reclining position. His torso and legs thus remain in a preferred position to enable maximum pedaling efficiency at any steering mode.

DETAILED DESCRIPTION OF A PREFERRED EMBODIMENT

Figure 1:
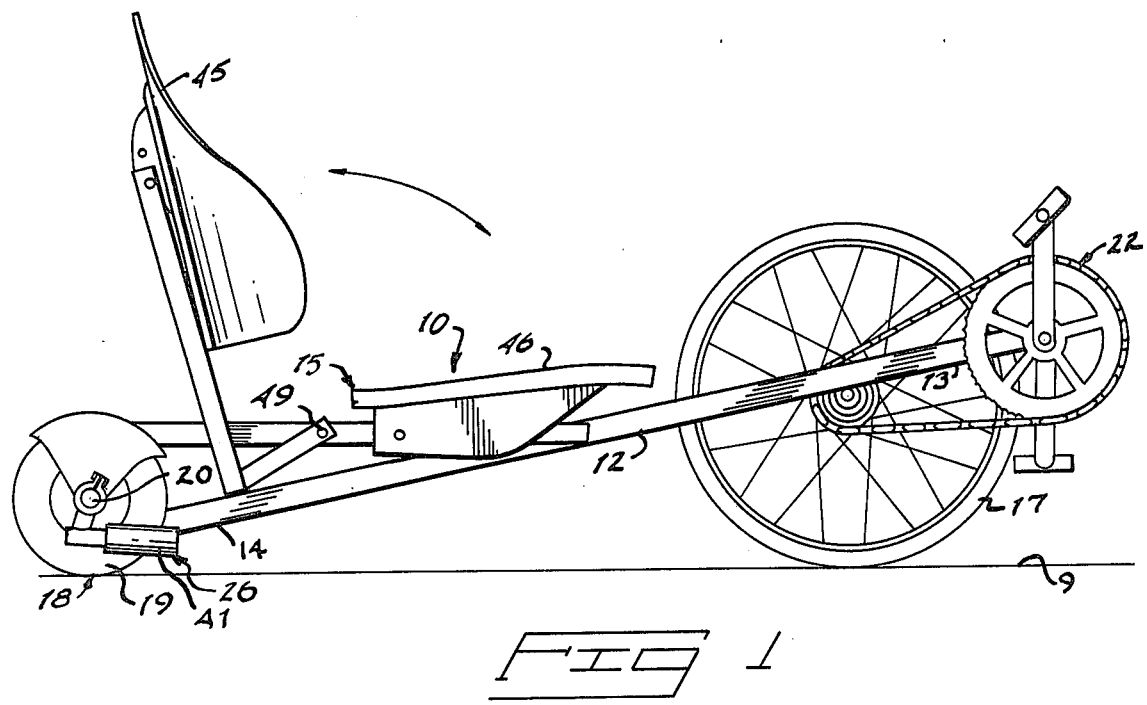
FIG. 1 is a side elevation view of the present vehicle.

The present vehicle is designated in the accompanying drawings by the reference character 10. The vehicle 10 is of the "tricycle" variety for supporting a rider in close proximity to a supporting surface such as the ground surface shown at 9.

The vehicle 10 includes an elongated frame 12 that extends from a forward end 13 to a rearward end 14. A seat 15 is provided intermediate the ends 13 and 14 for receiving and supporting the rider. The seat is situated rearward of a single front drive wheel 17. The seat is also situated upwardly adjacent and forward of a rearward support means 18. The vehicle is steerable through the support means 18 via a steering assembly 23. The vehicle 10 is powered through a drive means 22 which, in a preferred form, is a standard bicycle drive train.

The seat 15 is provided in two sections, a back support section 45 and a hip support section 46. The back support 45 is mounted to the frame at a pivot 49. The pivot 49 is situated about a horizontal back support pivot axis that is forward of the axle 20. The seat back support 45 can be folded on the pivot axis between storage and operative positions as indicated by the arrow in FIG. 1.

The front drive wheel 17 may be a typical bicycle wheel with a pneumatic tire on a wire spoke supported rim. The rim is mounted for free rotation by a conventional bearing to the forward frame end 13. The bearing will mount the wheel for free rotation on the frame 12 about a fixed horizontal drive wheel axis. It should be noted that the wheel 17 will tilt with the frame 12 since the mounting bearing is fixed to the frame. Therefore, transverse tilting of the frame (FIG. 3) relative to the ground surface will result in corresponding leaning of the wheel 17.

The front wheel 17 is powered through the drive means 22 which may be any appropriate driving mechanism including engines and electric motors. However, it is preferred that the drive mechanism be a drive train similar to that currently utilized in conjunction with bicycles. The preferred drive train therefore may consist of a standard crank set with oppositely extending crank arms and pedals mounted to their outward ends (FIG. 1). Appropriate transmission of driving power through the pedals to the wheel 17 may be provided by a standard bicycle drive train including any conventional gear selection range.

It may be noted that the crank set is positioned forwardly of the front wheel 17. The positioning of the crank set forward of the wheel decreases the necessary overall length of the vehicle. Since there is a relatively short distance between the front wheel axis and that of the rear ground support means 18, maneuverability is correspondingly increased.

The rear support means 18 broadly includes any form of device or mechanism for movably supporting the rear frame end along a support surface such as the ground 9. It may therefore include ski structures (not shown) for movement along snow or ice, or ice runners (also not shown) strictly for ice travel, or wheels 19 as shown in the accompanying drawings.

The pair of rear wheels 19 are mounted in spaced relation along an axle member 20. The wheels may rotate freely and coaxially on the axle member through provision of appropriate bearings (not shown). The axle 20 is mounted to the frame by the steering assembly 23.

The steering assembly 23 is designed to allow pivotal movement of the axle about two separate axes; a steering axis and a steering control axis. The steering axis lies within a vertical plane and is centered transversely behind the seat 15. It is shown at X—X in FIG. 5. The steering control axis is perpendicular to and intersects the steering axis. The steering control axis is shown at Y—Y in FIG. 6. Preferably the control axis Y—Y and the axis for the wheels 19 are coaxial.

The steering assembly 23 is comprised basically of two interfitted gimbal assemblies 24, 25 that mount the wheels 19 and axle 20 to the frame. A first gimbal mounts the wheels for pivotal movement about the steering axis and a second gimbal mounts the first gimbal to the frame for pivotal movement about the steering control axis. The second gimbal enables the steering axis to be adjusted angularly about the steering control axis by provision of a rider control means 26.

The first gimbal means includes a pin 30 that extends transversely through the axle 20. The pin 30 is centered coaxially on the steering axis X—X and is received in pivot sockets 31 of a split circular disc 32. The axle 20 extends through an opening 33 (FIG. 5) in the disc. The pin 30 projects through the axle and across the opening 33 to be pivotably received in low friction journals 34. The journals 34 are removably received within the sockets 31.

A split block 35 may be provided on the axle to pivot with the axle in the opening 33. Flat sides 36 of the block will slidably engage and rest against flat sides of the journals.

The disc 32 includes a circular peripheral race 37. The race 37 is centered on wheel axis via the mounting arrangement between pin 30 and sockets 31. The race 37 is received for free rotation about the steering control axis Y—Y within the second gimbal means 25.

The second gimbal means 25 is fixed to the frame 12 to mount the first gimbal for pivotal movement about the steering control axis Y—Y. Gimbal means 25 is comprised of a housing 38 fixed to the frame 12 at its transverse center, in alignment with the front wheel 17. The gimbal housing includes a circular opening defined by an annular race 39. The race 39 rotatably receives the race 37 of the first gimbal 24. A bearing sleeve 40 is mounted between the two gimbal members to ease rotation of the disc 32 about the steering control axis Y—Y.

Figure 2:
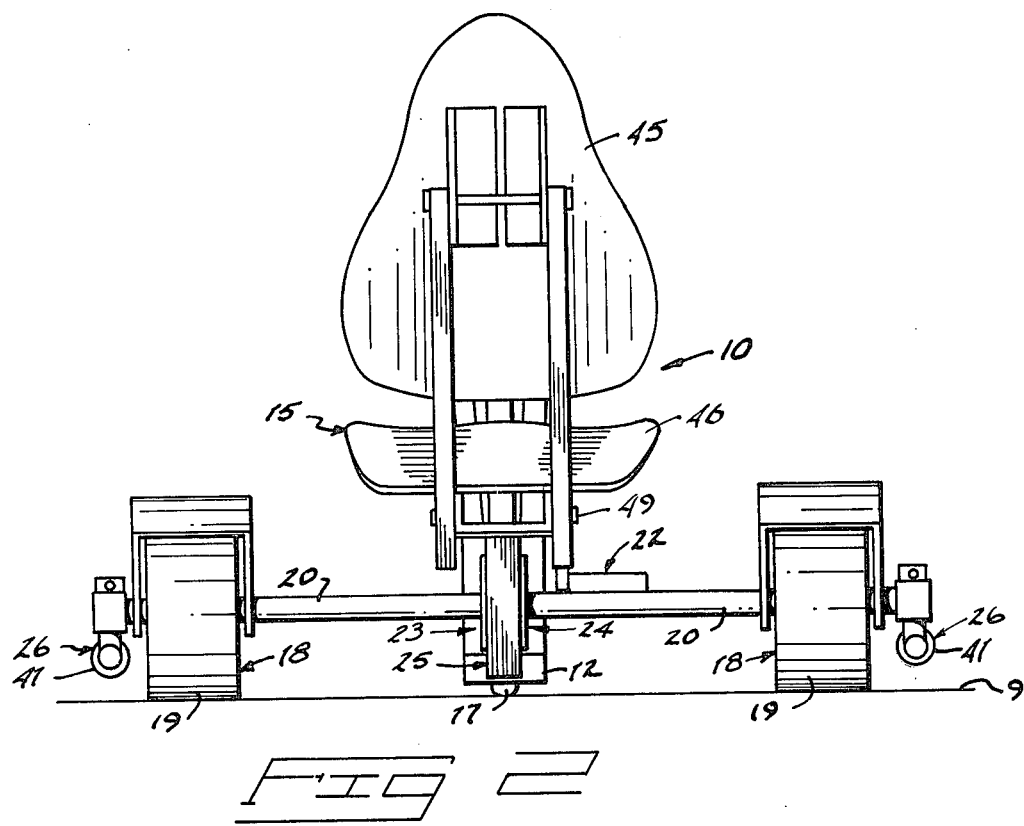
FIG. 2 is an enlarged rear elevation view.

The rider control means 26 may simply be comprised of a pair of hand grips 41 mounted to the axle 20. The hand grips can be positioned beyond the wheels on axle 20 as shown in FIGS. 1 and 2. Alternatively, the hand grips 41 can be situated between the wheels, depending on the wheel size and personal preference of the rider.

The hand grips 41 project forwardly toward the front wheel 17 to be gripped by the rider and pivoted about the coaxial wheel axis and steering control axis. Such movement causes corresponding angular movement of the pin 30, changing the overall steering characteristics of the vehicle.

If the handles 41 are pivoted to an upright orientation (FIG. 3), the pin 30 is pivoted to an almost horizontal orientation. The nearly horizontal pin will not allow turning of the wheels about the steering axis on the plane of the ground surface but will allow the frame to tilt transversely and thus allow steering as the rider leans toward the center of the turn. Long wide sweeping turns at high speeds may thus be accomplished without "steering" the vehicle by turning the axle 20 about the steering control axis Y—Y. Instead, the vehicle is steered as the rider shifts his weight from one side to the other so the frame will tip about axis X—X.

Figure 4:
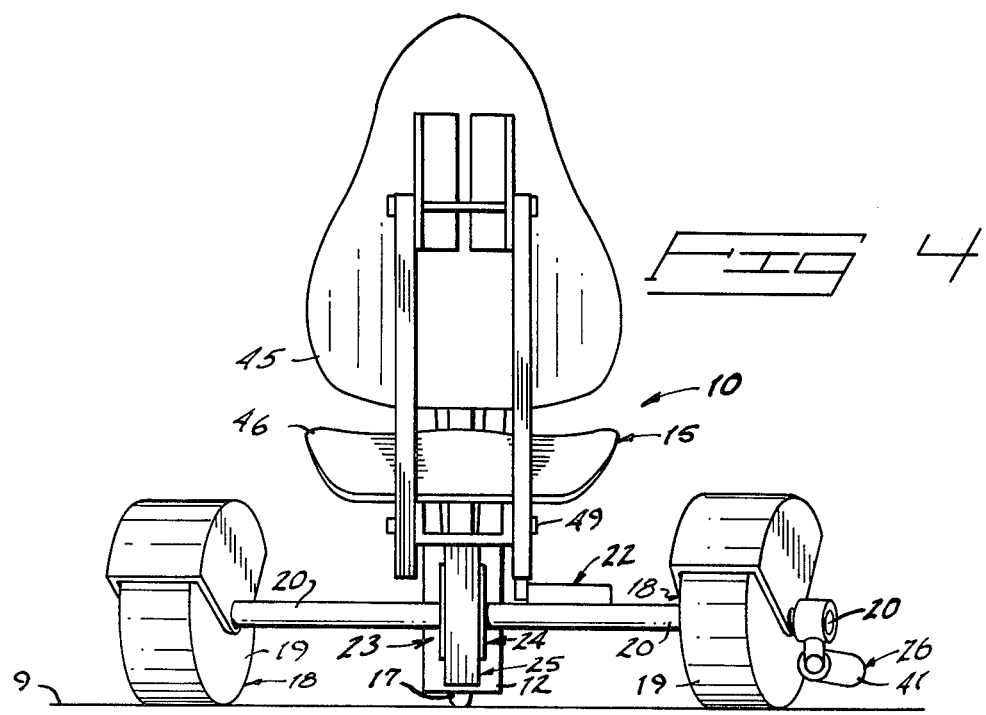
FIG. 4 is a view similar to FIG. 5 only showing the vehicle in a tight, low speed turn orientation.
Figure 5:
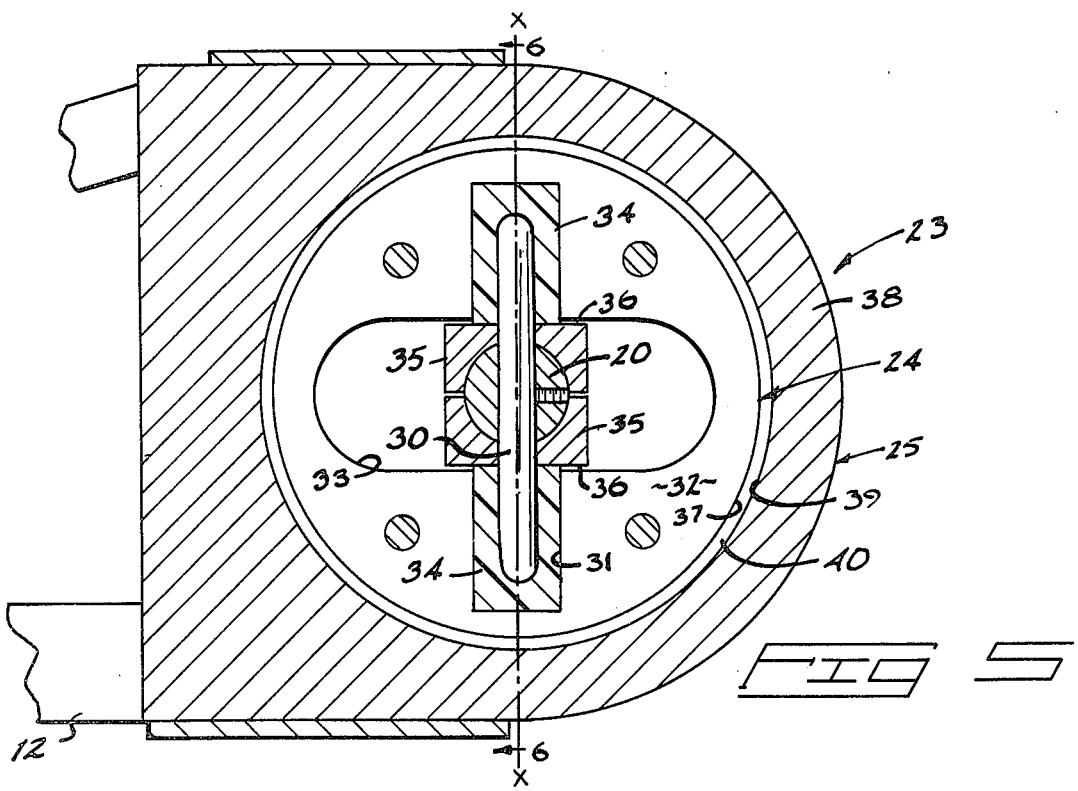
FIG. 5 is a sectional view taken along line 5—5 in FIG. 6.
Figure 6:
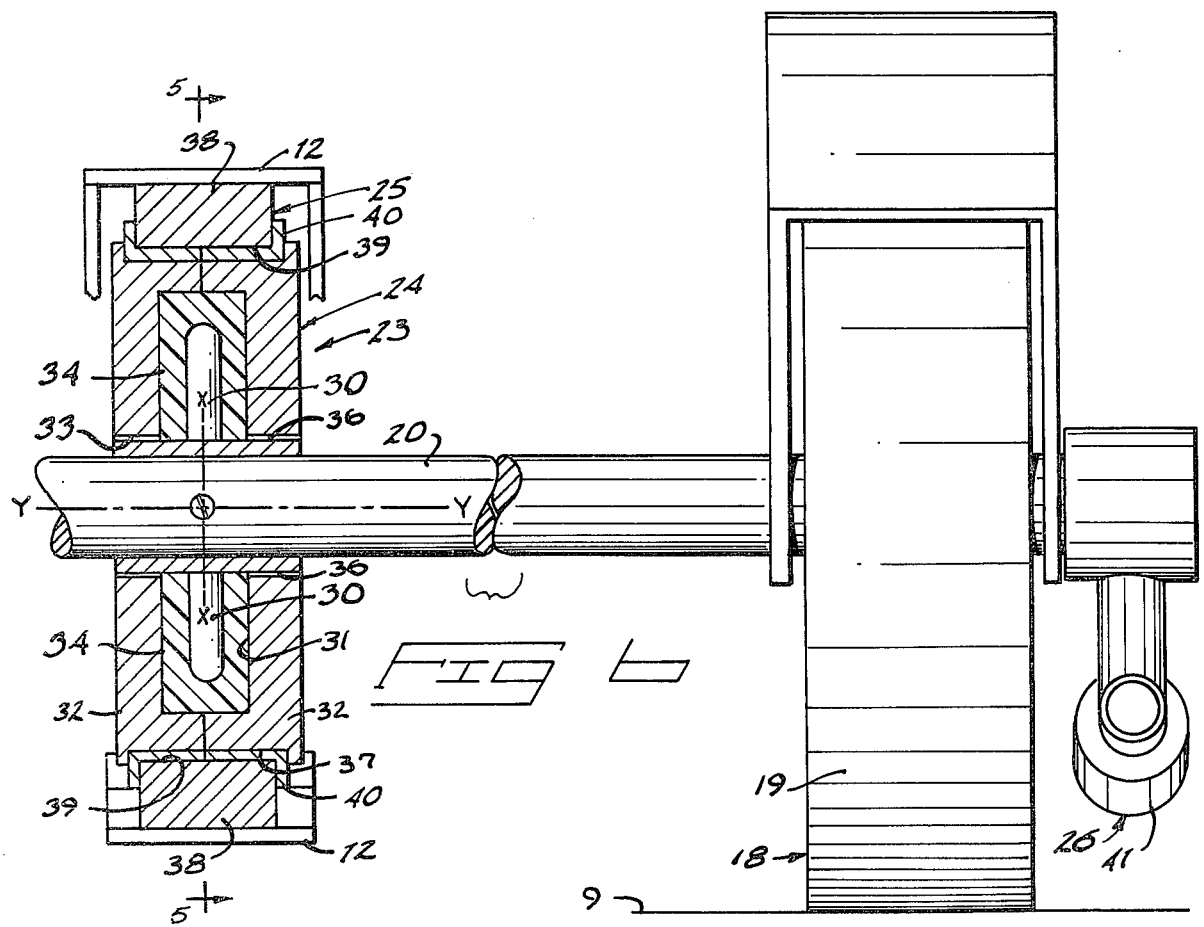
FIG. 6 is an enlarged sectional view taken along lines 6—6 in FIG. 5.

If the handles are pivoted to a horizontal or slightly downturned position, the pin 30 is correspondingly pivoted to an upright orientation (FIGS. 4–6). The upright pin will allow turning of the wheels about the pin axis (steering axis X—X) but will not permit much corresponding tilting of the frame. Thus, steering in this mode is accomplished by the rider leaning slightly in the direction of the turn and by turning the wheels and axle about the steering axis. Short, low speed turns may be made without tipping the frame, thus eliminating rider balance problems.

From the above description, operation of the present vehicle may now be understood.

The vehicle is mounted by standing over the seat 15 astride the front wheel 17. The rider may then seat himself with feet extending forwardly in contact with the crank set pedals. The rider's hands grasp the handles 41. No additional support is required and the rider may sit stationary on the vehicle without touching the ground surface. This does not require special balancing capabilities because the frame is supported at the front wheel and the rear wheels.

To initiate forward progress of the vehicle, the rider pushes the pedals similarly as one would in riding a bicycle. The driving force produced through the drive means 22 is transmitted to the drive wheel 17.

Maneuvering of the vehicle is accomplished by leaning in the direction of the desired turn. Selected angular relationship of the steering axis to the ground surface enables the rider to both turn the rear wheels and lean simultaneously. In turning, the vehicle is leaned into the turn along with the drive wheel 17. The weight of the rider is shifted inward toward the center of the radius. Therefore, the centrifugal forces produced during a turn are counteracted or negated by the rider's shifting weight.

Figure 3:
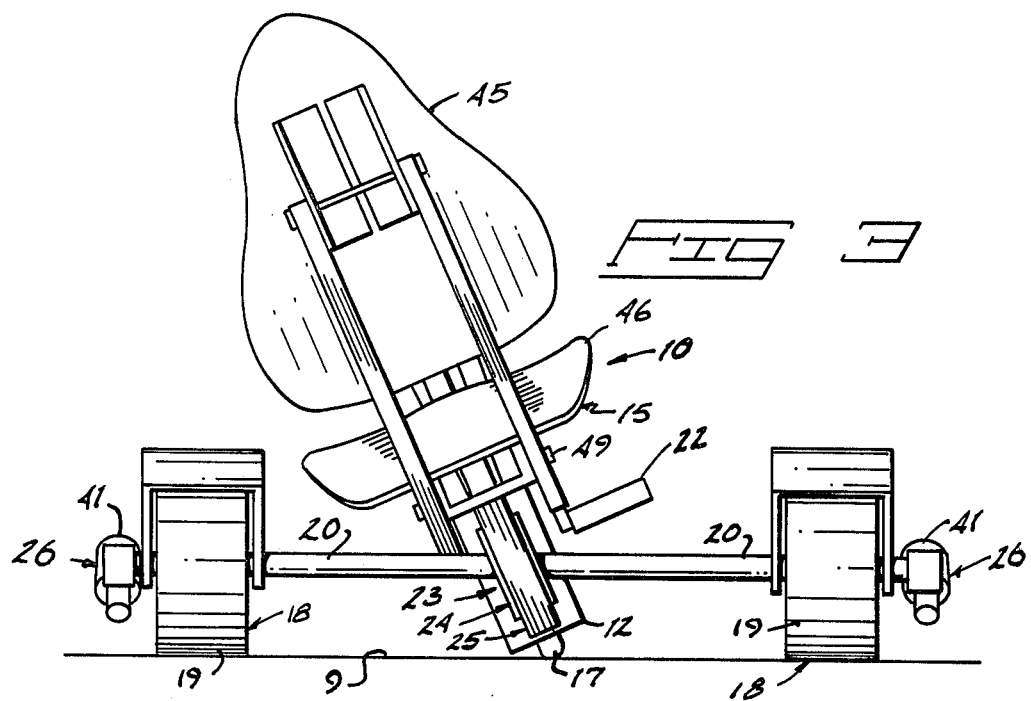
FIG. 3 is an enlarged rear elevational view showing the vehicle in a high speed turn orientation.

When the handles 41 are pivoted upright, the pin 30 (steering axis X—X) is shifted to a condition nearly parallel with the ground surface. In this situation when the rider leans into a corner, the rear wheels do not affect the resulting turn. They merely track behind the front wheel and the vehicle turns as does a bicycle or motorcycle when it is caused to turn by the rider leaning in the direction of turn. Turning is achieved by the shifted weight of the rider rather than by turning of the rear wheels and axle in the plane of the ground surface. Wide, high speed turns and straight forward riding is preferably accomplished with the steering axis in this position. This position also enables a rider to correct the attitude of the vehicle on a banked surface. FIG. 3 shows the handles pulled upright and the steering axis situated in a plane nearly parallel to the ground support surface 9. There it may be seen that the rear wheels have not turned in response to leaning of the vehicle frame.

As the rider shifts the hand grips 41 from the upright position of FIG. 3 toward a horizontal position as shown in FIG. 4, the steering axis is also angularly pivoted upwardly about the steering control axis. As the angle of the steering axis increases with respect to the ground surface, the amount of turning of the rear wheels (in response to lean or tilt of the vehicle frame due to the rider shifting weight) increases. If the steering axis were allowed to pivot to a position perpendicular with the ground surface, steering would be accomplished solely by turning of the hand grips 41 with no leaning of the rider involved whatsoever. It is preferred, however, to limit the upward pivotal movement of the steering axis to an angle slightly less than 90° to the ground surface. This allows sufficient maneuverability along with a certain amount of lean which the rider may prefer during low speed, tight maneuvers.

Obviously, an infinite number of positions are available between the two extreme positions of the steering mechanism described above. A slow movement of the hand grips 41 between these positions gradually shifts the axes and allows the rider to "trim" the vehicle smoothly into and out of turns. The turning radii may gradually decrease or increase as the rider moves the hand grips back and forwardly.

The above description has been given to set forth a preferred example of the present invention. The scope of the present invention is more precisely set forth by the following claims.

What we claim is:

1. A vehicle, comprising:
   an elongated frame having a forward end and rearward end;
   seat means at the rearward frame end for receiving and supporting a rider;
   a drive wheel mounted to the forward frame for rotation about a drive wheel axis;
   means for transmitting driving power to the drive wheel while the vehicle is in use;
   support means on the frame at the rearward end for movably engaging a supporting surface;
   first gimbal means adapted to mount said support means for pivotal movement about a steering axis;
   second gimbal means mounting the first gimbal means to the frame for pivotal movement thereon about a steering control axis that is perpendicular to and intersects the steering axis; and
   rider control means connected to the second gimbal means for permitting the rider to adjust the angle of the steering axis about the steering control axis relative to the frame while the vehicle is in use.

2. The vehicle as defined by claim 1 wherein said support means is comprised of a pair of supporting surface engaging wheels mounted to an axle for free rotation about an axis that is coaxial with the steering control axis and wherein the axle is mounted to the first gimbal means.

3. The vehicle as defined by claim 2 wherein the rider control means is comprised of hand grips fixed to the axle and extending forwardly therefrom to be gripped by the rider and turned to pivot the axle and first gimbal means about the coaxial wheel and steering control axes, thereby changing the angular relationship of the steering axis to the supporting surface.

4. The vehicle as defined by claim 1 wherein the second gimbal means is comprised of:
   a gimbal housing mounted to the frame at the rearward end thereof;
   said housing defining a circular opening bounded by a circular race centered on the steering control axis.

5. The vehicle as defined by claim 4 wherein the first gimbal means is comprised of:
   a circular disc having an outward peripheral race received by the circular race of the gimbal housing for rotation about the steering control axis; and
   pivot means mounting said support means to the circular disc for pivotal movement about the steering axis.

6. The vehicle as defined by claim 5 wherein the support means is comprised of:
   a pair of supporting surface engaging wheels; and
   an axle mounting the wheels for free coaxial rotation about a wheel axis.

7. The vehicle as defined by claim 6 wherein:
   the axle is mounted to the pivot means; and
   the pivot means is comprised of a pin projecting from the axle to be pivotably received within a socket formed in the circular disc.

8. The vehicle as defined by claim 1 wherein the seat means is comprised of:
   a hip rest section mounted to the frame forward of the support means and below the drive wheel axis; and
   a back rest section mounted to the frame behind the hip rest section for pivotal movement between an upright orientation and a folded orientation against the hip rest section.

9. The vehicle as defined by claim 6 wherein the rider control means is comprised of a hand grip fixed to the axle.

10. A steering control mechanism for a vehicle having a frame and a steerable support means comprising:
first gimbal means adapted to mount the support for pivotal movement about a steering axis;
second gimbal means adapted to mount the first gimbal means to the frame for pivotal movement thereon about a steering control axis that is perpendicular to and intersects the steering axis; and
control means connected to the first gimbal means for selectively pivoting the steering control axis and adapted to selectively vary the angular position of the steering axis relative to the frame.

11. A steering control mechanism as defined by claim 10 for vehicles wherein the support means is comprised of ground engaging wheels rotatable about a wheel axis and interconnected by an axle assembly, wherein:
the first gimbal means is adapted to mount the axle assembly with the steering axis perpendicular to and intersecting the wheel axis; and
the second gimbal means is adapted to mount the first gimbal means to the frame with the steering axis perpendicular to and intersecting the steering control axis and wheel axis.

12. The steering control mechanism as defined by claim 11 wherein the second gimbal means includes an annular race formed about a center point and wherein the first gimbal means is centered within the annular race and is adapted to mount the axle assembly so the center point of the annular race lies along the wheel axis.

13. The steering control mechanism as defined by claim 11 wherein the steering control axis and the wheel axis are coaxial.

* * * * *